March 21, 1933.  F. RIEBER.  1,902,184
VIBRATION SENSITIVE SYSTEM
Filed June 7, 1927
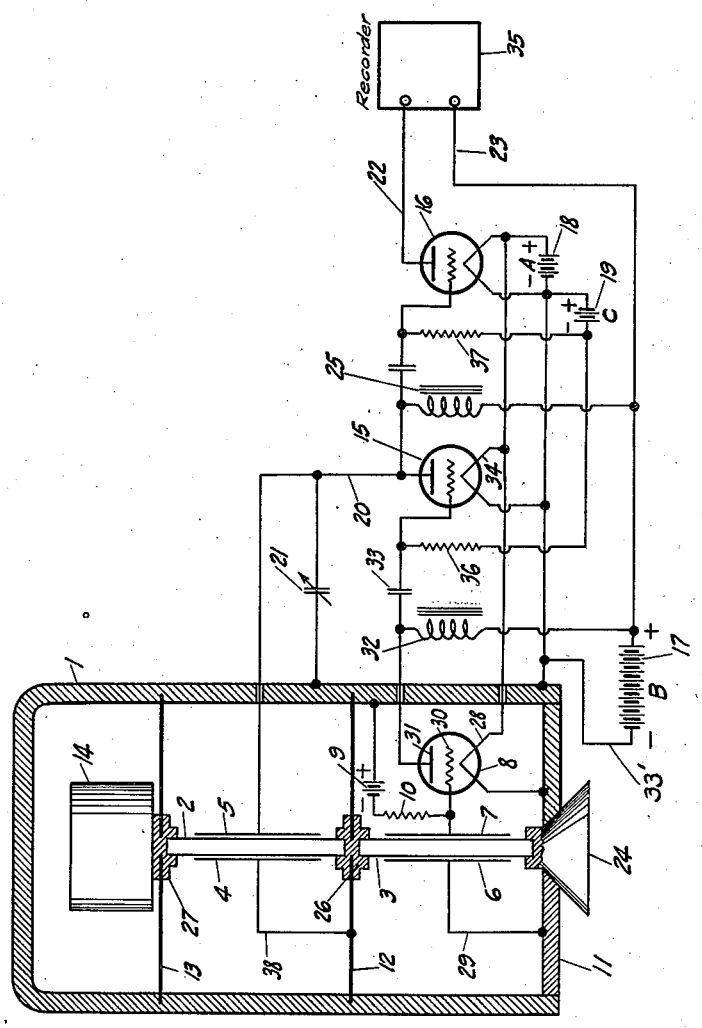
INVENTOR
Frank Rieber
BY
John Flam
HIS ATTORNEY Patented Mar. 21, 1933

1,902,184

UNITED STATES PATENT OFFICE

FRANK RIEBER, OF SAN FRANCISCO, CALIFORNIA

VIBRATION SENSITIVE SYSTEM

Application filed June 7, 1927. Serial No. 197,211.

This invention relates to a system for converting mechanical vibrations into electrical vibrations. More particularly it relates to a system of that character in which a piezoelectric crystal is utilized.

It is now well-known that certain crystals, such as rochelle salt crystals or quartz, exhibit piezo-electric properties; that is, electric potential differences are created across certain points of the crystal when it is subjected to pressure variations. It is also known that each individual crystal exhibits resonant properties; that is, it responds to a greater extent to a definite frequency of vibration. However, this trait or characteristic is not very well defined, for these crystals do nevertheless respond substantially to mechanical vibrations of frequencies differing materially from the resonant frequency.

It is one of the objects of my invention to sharpen up the resonance point of such systems, whereby a crystal device can be rendered exceptionally sensitive to vibrations of some particular frequency, but insensitive to vibrations of all other frequencies.

In piezo electric crystals, it has been found that the resonance frequency depends on the physical characteristics of the crystal; and in general, the larger the crystal, the lower the resonance frequency. It is obvious that under most circumstances it may sometimes be impracticable to operate and control a crystal beyond definite physical limits. It is another object of my invention to make it possible to set or adjust the frequency of resonance of a pieza crystal in a novel and simple manner.

Such vibration sensitive devices have been used in many diverse ways, such as for receiving and recording earth shocks, artificially produced for geophysical explorations; or for receiving and recording earth shocks caused by other happenings, such as the firing of guns or the like for locating batteries; or for receiving and recording vibrations from air or from water, whereby objects can be located, or signaling effected to mines or the like. My invention may be applied to any of these uses, and is intended to replace devices that are not so well adapted for this kind of work, such as microphones, magnetophones, and condenser microphones.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

The single figure is a schematic diagram showing one embodiment of my system.

As stated heretofore, it is well-known that certain types of crystals produce potential differences upon variations of physical pressure being applied to them. For example, if the piezo-electric member 3 is exposed to a longitudinal variable pressure, a potential difference varying in accordance with the pressure, is created between the conductive coatings 6 and 7 placed on opposite sides of the crystal 3.

It is also well-known that if the coatings be supplied with varying potential differences, then the crystal varies in length in accordance with these potential differences. I make use of this phenomenon to increase the response of the crystal 3 to pressure variations, by providing another piezo-electric device 2 having coatings 4 and 5, which is caused mechanically to affect the crystal 3 and in phase with the pressure variations so as to enhance their effect on this crystal.

In order to explain how this is possible, I shall first of all describe the mountings of the crystals. A casing 1 serves to enclose both crystals 2 and 3; it is covered at the bottom by the rigid plate or foot 11. To this plate is rigidly attached a contacting member 24, arranged to be placed in the medium from which vibrations are to be received. The bottom of the crystal 3 abuts this member 24; and its top is accommodated in a socket 26 fastened to a flexible diaphragm 12 extending across casing 1. The crystal 2 is placed immediately over the crystal 3. Its ends are accommodated respectively in the top of socket member 26, and in socket member 27 fastened to another flexible diaphragm 13 across the casing 1. A loading weight 14 rests on top of diaphragm 13, and serves to provide an opposing pressure to that occasioned by vibrations received at foot 24, and to impart a longitudinal stress on the crystals.

If foot 24 be placed in contact with the earth or other medium from which vibrations are received, the crystal 3 being held against said foot by mass 14, which tends to stand still, will be subjected to pressure variations. These are translated, in a manner to be hereinafter described, into electrical impulses. These impulses in turn act upon coatings 4 and 5 of crystal 2 to cause it to vary in length and in such sense as to assist creation of pressure variations in crystal 3. The mechanical characteristics of crystals 2, 3 and mass 14 are preferably so chosen that the natural resonant vibratory frequency of the combined system is much lower than the range of frequencies it is desired to receive. Within the range of operation, the system can by appropriate choice of the electrical amplifier devices, be made to respond strongly to any frequency; and frequencies beyond the range are cut off by proper design of the amplifying system. In this way, even if there exist disturbing vibrations at or near the natural resonance of the mechanical system just described, these vibrations will have little or no effect upon the amplifier systems.

I shall now describe the electric system of amplification. This system in the present instance utilizes electronic emission devices, such as audions. These audions each includes an evacuated vessel enclosing three electrodes. One electrode serves to emit electrons, as by being heated by an electric current, the electrode being made in filamentary form. The electron stream is received at another electrode called the plate or anode, which is kept at a potential positive with respect to the filament. It has been found that a third electrode, interposed between the filament and plate, can control the "space current" in the tube; so that even slight variations in potential difference between it and the filament cause comparatively large variations in the space current. An output circuit connecting the filament and plate responds to these variations, and thus forms the seat of amplified impulses. These devices can be coupled in tandem so as to increase the degree of amplification. Since their operation is well-known, further description than this brief summary is not essential.

A thermionic amplifier 8 of this sort is included in casing 1. Its filament 28 is grounded on the cover 11, and is heated by current from the "A" battery 18. One coating of piezo-electric device 3, such as 6, is connected to filament 28 as by the ground connection 29; the other coating 7 connects to the control electrode or grid 30. In this way potential differences between the coatings 6 and 7 are impressed on the input of audion 8. The plate electrode 31 is connected to filament 28 through the output impedance coil 32, the "B" battery 17, and ground connection 33'. The grid 30 can be biased to cause the space current characteristic to be set at the desired point, by the aid of the "C" battery 9 and resistance 10, which are connected between the grid 30 and filament 28. As variations in potential difference are produced between coatings 6 and 7, amplified potential difference variations exist across the plate 31 and filament 28.

These potential differences can be impressed in succession on the two amplifiers 15 and 16, each operating as amplifier 8. The control electrode of amplifier 15 is connected, for this purpose, through stopping condenser 33 with plate 31; and the filament 34 being in parallel with filament 28, is of course in connection therewith. The output circuit includes the impedance 25 and battery 17. The amplifier 16 is connected to the output circuit of amplifier 15 in the same manner as described in connection with the previous ones; and its output circuit includes leads 22 and 23, which can connect to a recorder 35 or other translating device. The control electrodes of amplifiers 15 and 16 can be biased by the aid of the "C" battery 19 and resistances 36 and 37.

In order to affect piezo-electric device 2 in the manner hereinbefore specified, the coating 4 thereof is connected, as by ground connection 38, with the filament system of the audions. The other coating 5 is connected, as by lead 20, with the plate electrode of one of the amplifiers, for example, of amplifier 15. It is thus evident that the amplified electrical impulses produced by device 3 is impressed on the device 2; and of course this is done in such manner, and the proportions of element 2 are so chosen, as to cause it to assist the device 3. The apparatus thus becomes somewhat similar to the regenerative receiver used in radio work. This effect may be accentuated with respect to any desired frequency by including the variable condenser 21, paralleling the coatings 4 and 5, thereby creating a resonant circuit comprising impedance 25 and this condenser. When vibrations of the frequency with which circuit 21—25 is in resonance, arrive at the contact plate 24, they will produce an effect upon the system far greater than that of any other vibratory frequency.

I claim:

1. In a piezo-electric device, a pair of superimposed piezo-electric crystals, a contact member adjacent the free end of one of them, means whereby said two crystals are supported in alinement and so that they can mechanically affect each other and means providing a substantial mass acting on the free end of the other one of them.

2. In combination, a casing, a contact member extending from the casing, a pair of piezo-electric devices in said casing, one over the other and mechanically in connection with each other, the lower of said devices being in mechanical contact with said contact member, a diaphragm extending across the casing and connected between the devices, another diaphragm extending across the casing and supporting the top end of the top device, and a weight acting on said top end.

3. In a system for detecting mechanical vibrations, a piezo-electric device for translating mechanical vibrations into electrical vibrations, such device having a natural frequency below the frequency of the vibrations to be received, a contact member in contact with said device for transmitting the received mechanical vibrations thereto, an electronic emission amplifier for amplifying said electrical vibrations, and an output circuit for said amplifier, tuned to be resonant at the frequency it is desired to receive.

In testimony whereof I have hereunto set my hand.

FRANK RIEBER.